Nov. 11, 1958   W. R. STREED   2,859,765
SAMPLING VALVE FOR SUSPENSIONS
Filed Nov. 18, 1955
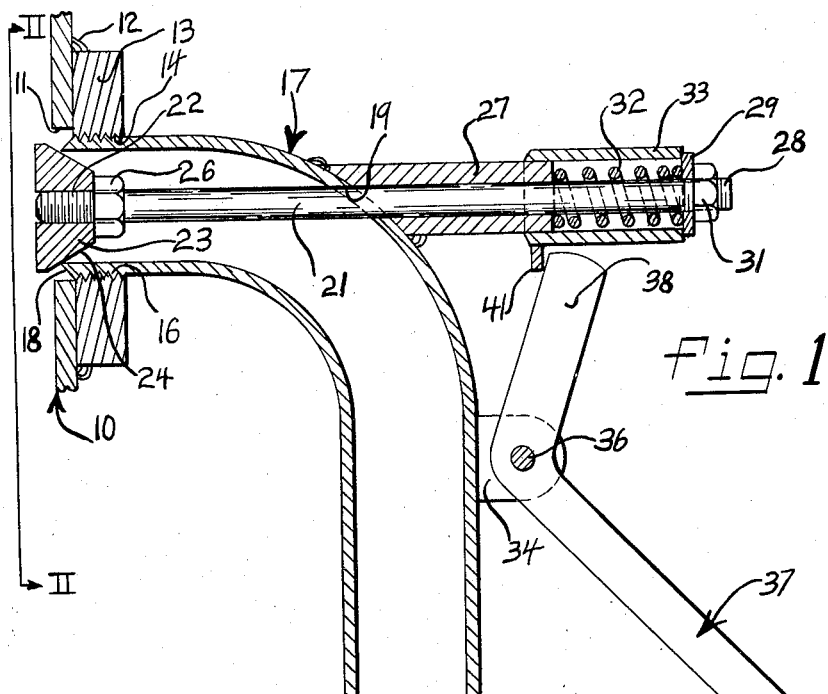
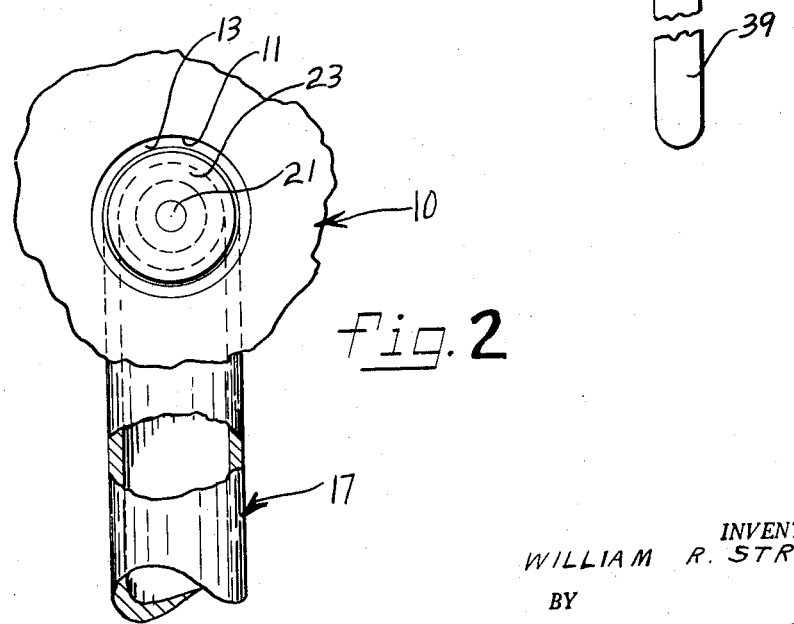
INVENTOR.
WILLIAM R. STREED
BY
Jennings & Carter
ATTORNEYS

United States Patent Office 2,859,765
Patented Nov. 11, 1958

2,859,765

SAMPLING VALVE FOR SUSPENSIONS

William R. Streed, Attalla, Ala.

Application November 18, 1955, Serial No. 547,692

1 Claim. (Cl. 137—242)

This invention relates to a sampling valve for suspensions and more particularly to such a valve which is especially adapted for removing samples of wood pulp suspended in water.

Another object of my invention is to provide a sampling valve of the character designated in which the contact area between the valve plug and its seat is reduced to a minimum, thereby preventing clogging of fibrous materials between the plug and its seat.

A further object of my invention is to provide a sampling valve for suspensions in which the plug thereof is urged by resilient means toward seated position whereby the valve is automatically closed after the removal of each sample.

A still further object of my invention is to provide a sampling valve of the character designated which shall be simple of construction, economical of manufacture and adapted for use with all types of suspension receptacles and conduits for conveying the same.

Apparatus embodying features of my invention is shown in the accompanying drawing forming a part of this application, in which:

Fig. 1 is a vertical sectional view of the valve; and,

Fig. 2 is a view taken generally along the line II—II of Fig. 1.

Referring now to the drawing for a better understanding of my invention, I show at 10 a fragment of a receptacle for a suspension, such as wood pulp suspended in water. The receptacle is provided with a discharge passageway 11 which is preferably in the form of a round opening. Secured to the receptacle 10 by any suitable means, such as by welding at 12 is a supporting bracket 13 having an internally threaded opening 14 therein which is slightly smaller than the discharge passageway 11 and concentric therewith. In threaded engagement with the internally threaded opening 14 is an externally threaded portion 16 at the inner end of a discharge conduit 17. The inner end of the conduit 17 projects inwardly of the passageway 11 and is tapered inwardly to provide a relatively sharp valve seat 18, as shown in Fig. 1.

A suitable opening 19 is provided in the discharge conduit 17 in alignment with the discharge passageway 11 for receiving an actuating rod 21. Threadedly connected to the inner end of the rod 21 by means of threads 22 is an outwardly tapered valve plug 23. The valve plug 23 is preferably in the form of a truncated cone having outwardly tapered side portions 24 which engage the valve seat 18 with a fluid tight fit when the plug is moved outwardly, a portion of plug 23 being disposed in seated position within the conduit 17 and another adjoining portion being disposed outwardly of the valve seat 18 within the receptacle 10. The plug 23 is held in adjusted position relative to the rod 21 by means of a lock nut 26.

Secured to the outer surface of the discharge conduit and surrounding the actuating rod 21 is a sleeve like bearing member 27 which terminates short of the outer end of the rod 21, as shown in Fig. 1. The outer end of the rod 21 is threaded as at 28 for receiving a spring abutment 29. In threaded engagement with the outer end of the actuating rod 21 outwardly of the spring abutment 29 is a lock nut 31. Surrounding the rod 21 intermediate the outer end of the bearing sleeve member 27 and the spring abutment 29 is a compression spring 32 which urges the rod 21 and the valve plug 23 outward toward seated position. Secured to the spring abutment 29 is the outer end of a sleeve member 33 which incases the spring 32. The inner end of the sleeve member 33 is in sliding contact with the outer surface of the bearing sleeve member 27, as shown.

Mounted on the discharge conduit 17 below the bearing sleeve member 27 is an outwardly projecting support bracket 34. Pivotally connected to the support bracket 34 by means of a pin 36 is an operating lever 37 having an upwardly projecting arm 38 at one side of the pivot pin which terminates adjacent the sleeve member 33 and a handle portion 39 at the other side thereof. Mounted on the sleeve member 33 in position to be engaged by the arm 38 is a projection 41.

From the foregoing description, the operation of my improved sampling valve will be readily understood. During normal operation, the spring 32 urges the valve plug 23 into seated engagement with the valve seat 18. When a sample of the suspension in the receptacle 10 is to be taken, the operating lever 37 is moved in a counterclockwise direction, as viewed in Fig. 1. The projection 41 is then engaged by the arm 38 causing the actuating rod 21 to move the valve plug 23 to unseated position thereby discharging the sample from the receptacle 10. Upon release of the operating lever 37, the spring 32 returns the valve plug 23 into engagement with the relatively sharp valve seat 18, as shown in Fig. 1. The valve plug is then retained in this position until the operating lever 37 is again operated to remove another sample of the suspension from receptacle 10.

From the foregoing, it will be seen that I have devised an improved valve for removing samples of suspensions from a receptacle. By providing a relatively sharp inwardly tapered valve seat which engages the outwardly tapered surface of the valve plug, the valve plug moves freely toward seated position without the fibrous substances within the suspension interfering with the movement thereof. That is to say, the engagement between the valve plug and the relatively sharp seat causes any fibrous material therebetween to be cut whereby the plug moves to fully closed position each time the operating lever 37 is released. Also, by providing resilient means for urging the valve plug toward seated position the plug automatically closes itself after each operation of the lever 37. Furthermore, by constructing the sampling valve of stainless steel or the like, it is particularly adapted for handling various suspensions of chemical compounds without the liability of corrosion. In actual practice, I have found that my sampling valve is satisfactory in every respect and may be readily installed on conventional type receptacles and conduits carrying suspensions.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

A valve for removing samples of a suspension from a receptacle, a vertically extending L-shaped sample discharge conduit of a substantially uniform outer and inner diameter adapted for attachment at its upper end of the side of a receptacle for selectively allowing the flow of sample suspensions therethrough, the upper end of said conduit being tapered from the outer surface thereof and forming a sharp inner edge on the conduit for a valve seat, a valve plug having tapered side portions for selectively engaging the valve seat in a fluid tight fit with a portion of the valve being disposed in seated position within the conduit and another adjoining portion being disposed outwardly of the conduit and adapted for extending within a receptacle, an actuating rod connected at its inner end to said valve, there being an opening in said conduit through which said rod projects, a bearing sleeve secured to the outer surface of said conduit and surrounding said rod, a spring abutment axially spaced from the bearing sleeve and adjustably connected to said rod adjacent the outer end thereof, a compression spring surrounding said rod between said abutment and the bearing sleeve for urging the rod outwardly and seating the plug on said valve seat, a slidable sleeve like member surrounding the spring and secured at one end to said spring abutment, the other end of said sleeve like member extending around said bearing sleeve and being in sliding contact therewith, an operating handle pivotally connected on said conduit below the actuating rod and operatively connected to said sleeve like member for moving said actuating rod and said spring abutment inwardly against the compression spring and thereby opening the valve and allowing the flow of a sample suspension downwardly through the conduit from a receptacle.

References Cited in the file of this patent

UNITED STATES PATENTS

| | | |
|---|---|---|
| 663,736 | Delaney | Dec. 11, 1900 |
| 1,153,343 | Saefke | Sept. 14, 1915 |
| 1,175,203 | Truesdell | Mar. 14, 1916 |
| 1,394,657 | Wertz | Oct. 25, 1921 |
| 1,829,120 | Toews | Oct. 27, 1931 |
| 1,899,154 | Karrick | Feb. 28, 1933 |

FOREIGN PATENTS

| | | |
|---|---|---|
| 21,236 | Great Britain | of 1911 |